United States Patent
Luxon

[11] Patent Number: 5,931,105
[45] Date of Patent: Aug. 3, 1999

[54] SENSOR PLUGS FOR A SEED TUBE

[75] Inventor: Gary Deloy Luxon, Moline, Ill.

[73] Assignee: Deere & Company, Moline, Ill.

[21] Appl. No.: 09/205,877

[22] Filed: Dec. 4, 1998

[51] Int. Cl.⁶ .......................... B65B 57/18; H02K 35/00
[52] U.S. Cl. ........................................... 111/170; 111/200
[58] Field of Search .................................. 111/170, 174, 111/200; 221/211

[56] References Cited

U.S. PATENT DOCUMENTS

| | | | |
|---|---|---|---|
| 4,915,258 | 4/1990 | Olson | 221/211 |
| 5,533,458 | 7/1996 | Bergland et al. | 111/200 |
| 5,542,363 | 8/1996 | Gamino | 111/170 |
| 5,655,468 | 8/1997 | Ledermann et al. | 111/174 X |
| 5,664,507 | 9/1997 | Bergland et al. | 111/170 X |
| 5,697,308 | 12/1997 | Rowlett | 111/170 X |

*Primary Examiner*—Christopher J. Novosad

[57] ABSTRACT

Sensor plugs are used to fill in sensor apertures formed in the front and rear walls of seed tubes used on row crop planters. The size of the plug and the depth of the plug is dictated by the diameter of the sensor aperture and the thickness of the walls of the seed tube. The interior surface of the plug is designed to follow the inside surface of the seed tube. The outside of the plug is provided with a cap assembly that is larger than the sensor aperture. This cap assembly has an inside surface that bears against the outside surface of the seed tube. A holding assembly comprising either a resilient C-clamp or plastic tie band are used to hold the cap assemblies against the seed tube.

16 Claims, 3 Drawing Sheets

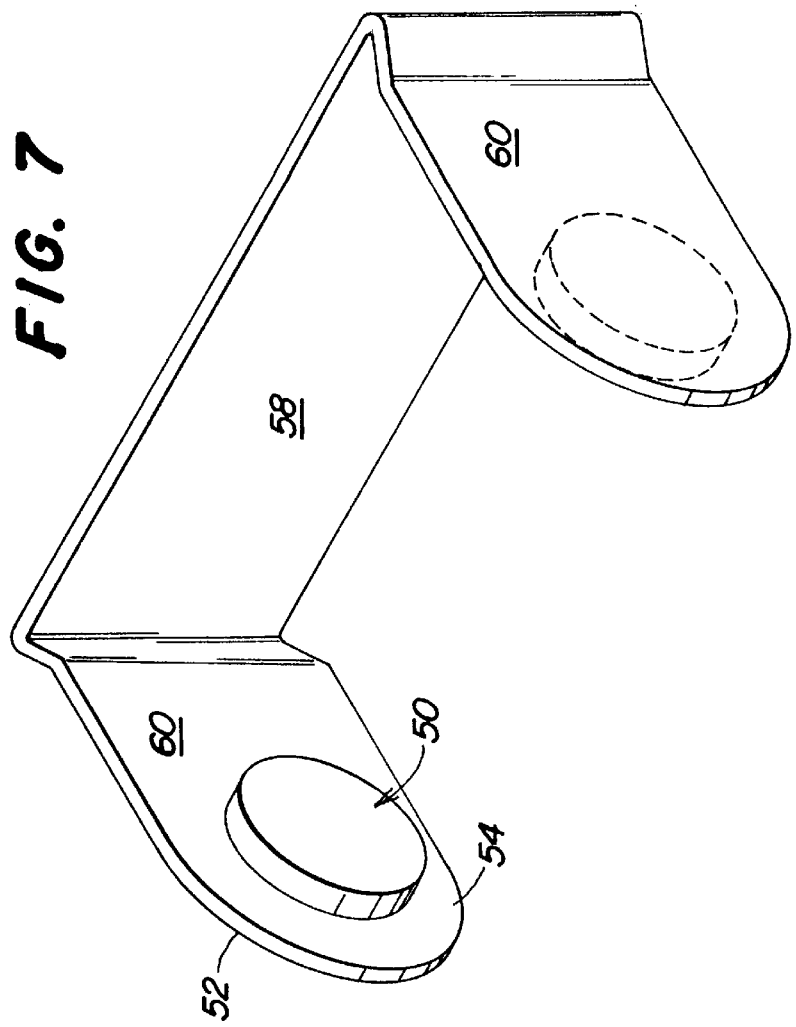
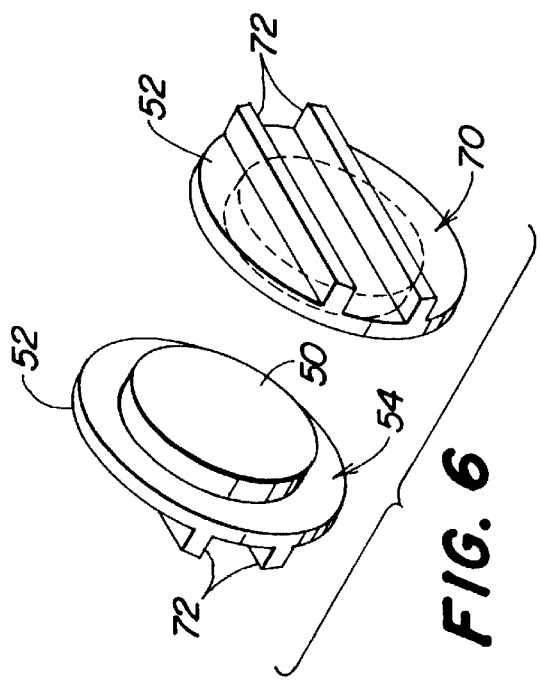

SENSOR PLUGS FOR A SEED TUBE

BACKGROUND OF THE INVENTION

1. Field of the Invention

The invention is directed to plugs for closing sensor apertures in a seed tube of a row crop planting unit.

2. Description of the Prior Art

Agricultural seeding machines are typically provided with a seed meter and a furrow opener between which extends a seed tube. The seed meter measures the amount of seed received from a seed reservoir and meters the amount to be directed to the planting furrow formed by the furrow opener. The seed tube transports the seed from the seed meter to the planting furrow formed by the furrow opener.

A typical seed tube comprises a forward wall and a rear wall which are joined together by sidewalls forming a hollow tube. The forward and rear walls are curved rearwardly. As the seed is dropped from the seed meter it runs down the inside surface of the forward wall into the planting furrow.

To insure that the planting unit is operating correctly, the planter maybe provided with a planter monitor having a seed sensor. A typical seed sensor is marketed by Dickey-john Corporation of Auburn, Ill. The seed sensor components are mounted to the front and rear walls of the seed tube. The front wall is provided with a first sensor aperture and the rear wall is provided with a second sensor aperture. A light is projected from a light source located in the second sensor aperture of the rear wall across the seed tube to a light receiver located in the sensor aperture of the forward wall. Whenever a seed passes between the light source and the light receiver, the seed interrupts the light beam and the seed is detected.

Currently planter manufacturers need two different seed tubes for a specific planter configuration because not all farmers have planter monitors with seed sensors. As such the manufacture must have seed tubes without sensor apertures and seed tubes with sensor apertures for each planter configuration having a different seed tube. This leads to a proliferation of parts when the manufacturer has a number of planter configurations having different seed tubes.

SUMMARY

The present invention comprises plugs assemblies for filling in sensor apertures in a seed tube. As the sensor apertures are generally the same diameter, one set of plugs can be used with all seed tubes across the different planter lines. In this way a manufacturer only needs sensor seed tubes having apertures using plug assemblies for non-apertured applications.

The size of the plug and the depth of the plug is dictated by the diameter of the sensor aperture and the thickness of the walls of the seed tube. The interior surface of the plug is designed to follow the inside surface of the seed tube. The outside of the plug is provided with a cap assembly that is larger than the sensor aperture. This cap assembly has an inside surface that bears against the outside surface of the seed tube. A holding assembly either comprising a resilient C-clamp or plastic tie band are used to hold the cap assemblies against the seed tube.

BRIEF DESCRIPTION OF THE DRAWINGS

FIG. 6 is a perspective view of the plugs used with the tie band holding assembly.

FIG. 7 is a perspective view of the plugs and C-clamp holding assembly.

DETAILED DESCRIPTION

Figure 1:
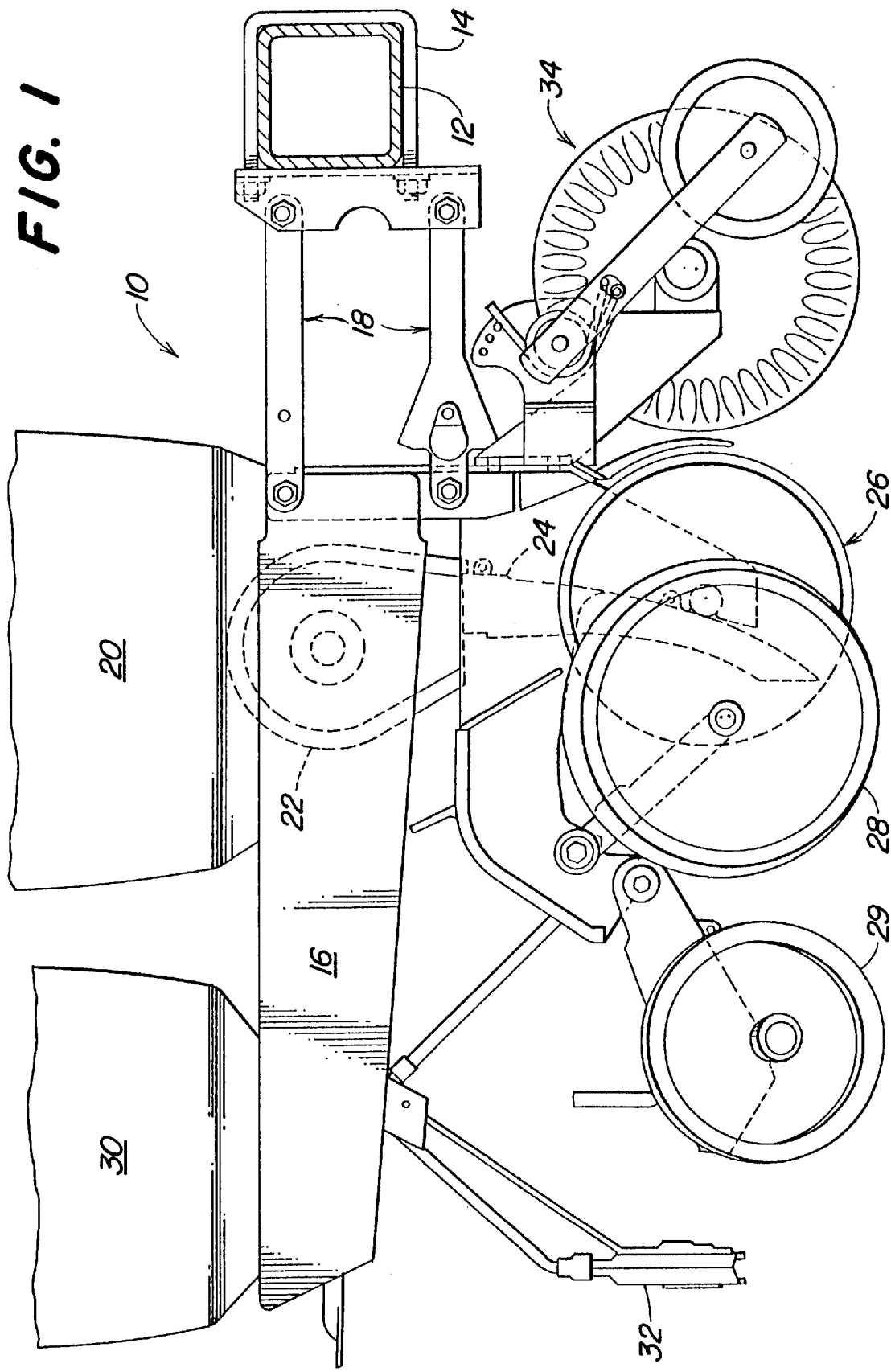
FIG. 1 is a side view of a planter row unit.

FIG. 1 is a side view of a row crop planting unit 10 that is mounted to rectangular toolbar 12 by U-bolts 14. The planting unit 10 is provided with a frame 16 having a parallelogram linkage 18 for coupling the planting unit 10 to the toolbar 12. Seed is stored in seed hopper 20 and directed to seed meter 22. From the seed meter 22 the seed is dropped into seed tube 24 into the planting furrow formed by furrow opener 26. Gauge wheels 28 control the depth of planting and closing wheels 29 close the planting furrow.

Pesticides can be stored in a chemical hopper 30 which is mounted to the planter unit frame 16. A chemical meter, not shown, directs chemicals to an application assembly 32. This particular planting unit is provided with a row cleaner attachment 34.

The seed tube 24 is provided with a curved forward wall 36, a curved rear wall 38 and two sidewalls 40 joining the front and rear walls 36 and 38. The forward and rear walls are curved rearwardly. The tube has an open top 42 and an open bottom 44. The exterior front wall is also provided with tangs 45 for mounting the seed tube to the planting unit frame 16.

The seed tube is provided with two circular sensor apertures, a sensor aperture 46 located on the forward wall and a second sensor aperture 48 located on the rear wall directly opposite the sensor aperture 46.

The plugs 50 of the present invention are used to fill in the sensor apertures 46 and 48. As such they have a circular cross section conforming to the shape of the apertures. In addition their depth is the same as the thickness of the front and rear walls 36 and 38 of the seed tube.

All the plugs are provided with a cap assembly 52 having an inside surface 54 which bears against the outside surface of the seed tube. As the cap assembly 52 is larger than the aperture it prevents the plugs from falling into the seed tube.

Figure 2:
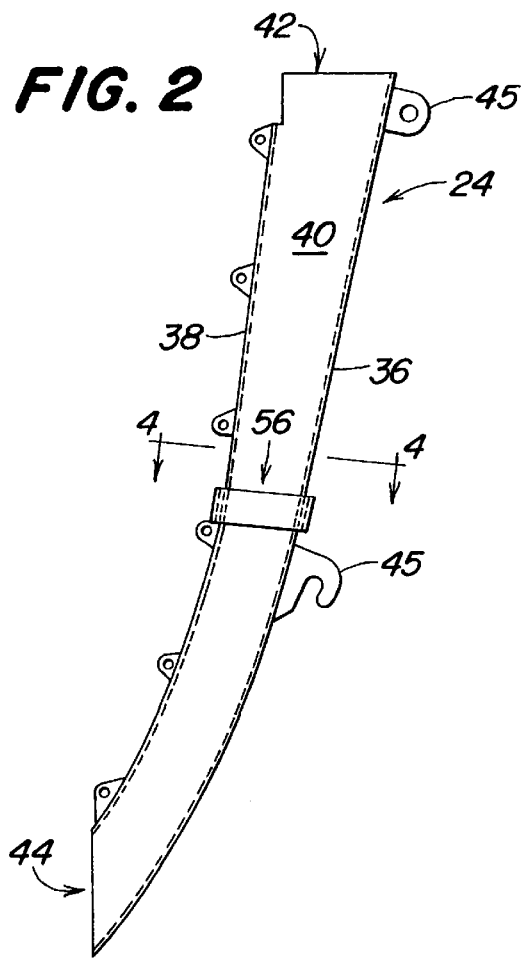
FIG. 2 is a side view of a seed tube having the C-clamp holding assembly.
Figure 4:
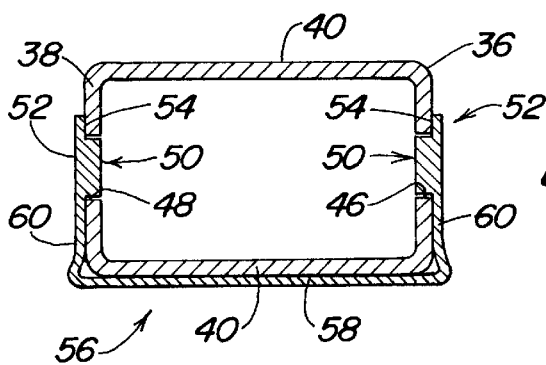
FIG. 4 is a cross sectional view taken along line 4—4 in FIG. 2.

Two alternate holding assemblies for holding the plugs to the seed tube are illustrated. The first illustrated in FIGS. 2, 4 and 6 is the C-clamp holding assembly 56. The C-clamp holding assembly is made of a resilient material like plastic formed into a C having a base 58 and legs 60. The C-clamp is sized so that the legs are biased inwardly when the clamp is fitted over a seed tube at the sensor aperture location. The inwardly clamping force of the legs is relieved to some degree when the plugs 50 are inserted into the sensor apertures. As shown in the figures the cap assembly of the plugs for the C-clamp holding assembly are integrally formed as the legs 60.

Figure 3:
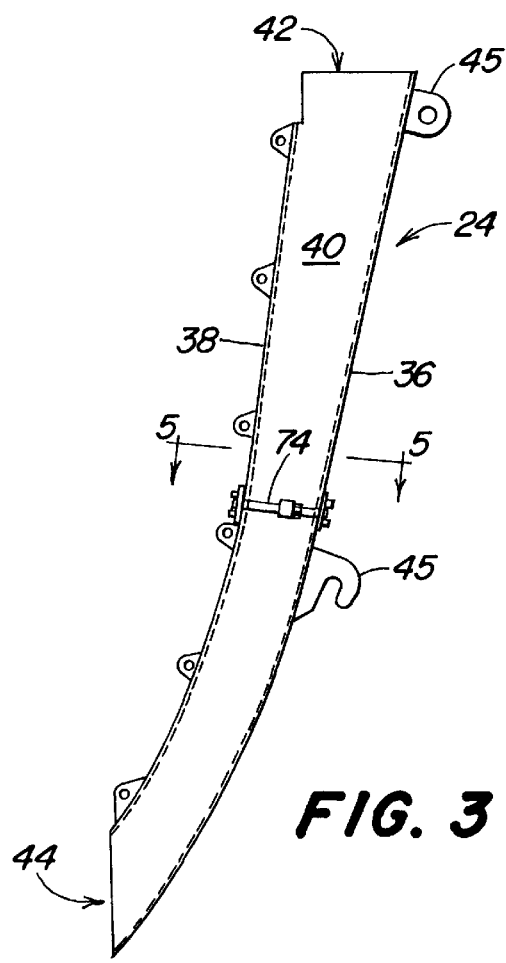
FIG. 3 is a side view of a seed tube having a tie band holding assembly.
Figure 5:
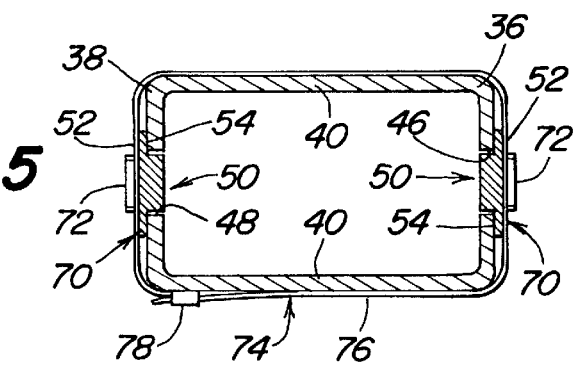
FIG. 5 is a cross sectional view taken along line 5—5 in FIG. 3.

In the alternate embodiment illustrated in FIGS. 3, 5 and 7, each plug 50 is provided with a circular cap assembly having an outside surface 70. The outside surface is provided with two parallel ridges 72 defining a channel in which a tie band 74 is trapped. The tie band 74 is a plastic band 76 having a latching assembly 78. It is of the type used to bundle electrical cables together. With this embodiment the plugs are inserted in the apertures and the tie band wrapped around the cap assemblies and latched in place thereby holding the plugs in the sensor apertures.

The present invention should not be limited by the above described embodiment, but should be limited solely by the claims that follow.

I claim:

1. An agricultural planter for planting seeds in the ground, the planter comprising:

a frame;

a seed reservoir mounted to the frame;

a furrow opener is mounted to the frame for forming a planting furrow;

a seed meter is mounted to the frame for receiving seed from the seed reservoir and metering the amount of seed discharged from the meter;

a seed tube is mounted to the frame and extends between the seed meter and the planting furrow formed by the furrow opener, the seed tube having a front wall and a rear wall which are joined together by two sidewalls, the front wall having an outside surface, the seed tube having an open top for receiving seed from the seed meter and an open bottom for depositing seed in the planting furrow;

the front and rear walls are provided with sensor apertures for receiving a sensor for detecting seeds passing through the seed tube; and a plug is inserted into the sensor apertures, the plugs are provided with cap assemblies that are larger than the apertures, the cap assemblies are provided with an inside surface which engages the outside surface of the seed tube, the plugs are held in place by a holding assembly.

2. A planter as defined by claim 1 wherein the plugs are shaped to conform to the shape of the sensor apertures.

3. A planter as defined by claim 2 wherein the plugs have a depth conforming to the thickness of the front and rear walls of the seed tube.

4. A planter as defined by claim 3 wherein the holding assembly comprises a resilient C-clamp having a base member and two legs.

5. A planter as defined by claim 4 wherein the cap assemblies of the plugs are integral with the legs of the C-clamp.

6. A planter as defined by claim 3 wherein the cap assemblies of the plugs are provided with an outside surface having two parallel ridges defining a channel into which is inserted a tie band that wraps around the seed tube.

7. A sensor plug for sensor apertures in a seed tube of an agricultural planter, the sensor plug comprising:

a plug shaped to conform to the shape of the sensor apertures, the plug having a depth conforming to the thickness of the front and rear walls of the seed tube;

a cap assembly is mounted to the plug and is larger than the sensor aperture and is provided with an inside surface that bears against the seed tube; and a holding assembly for holding the cap assemblies against the seed tube.

8. A sensor plug as defined by claim 7 wherein the holding assembly comprises a resilient C-clamp having a base member and two legs.

9. A sensor plug as defined by claim 8 wherein the cap assemblies of the plugs are integral with the legs of the C-clamp.

10. A sensor plug as defined by claim 7 wherein the cap assemblies of the plugs are provided with an outside surface having two parallel ridges defining a channel into which is inserted a tie band that wraps around the seed tube.

11. A seed tube for an agricultural planter, the seed tube comprising:

a tube having a front wall and a rear wall which are joined together by two sidewalls, the front wall having an outside surface, the tube having an open top for receiving seed and an open bottom for depositing seed;

the front and rear walls are provided with sensor apertures for receiving a sensor for detecting seeds passing through the seed tube; and a plug is inserted into the sensor apertures, the plugs are provided with cap assemblies that are larger than the apertures, the cap assemblies are provided with an inside surface which engages the outside surface of the seed tube, the plugs are held in place by a holding assembly.

12. A seed tube as defined by claim 11 wherein the plugs are shaped to conform to the shape of the sensor apertures.

13. A seed tube as defined by claim 12 wherein the plugs have a depth conforming to the thickness of the front and rear walls of the seed tube.

14. A seed tube as defined by claim 13 wherein the holding assembly comprises a resilient C-clamp having a base member and two legs.

15. A seed tube as defined by claim 14 wherein the cap assemblies of the plugs are integral with the legs of the C-clamp.

16. A seed tube as defined by claim 13 wherein the cap assemblies of the plugs are provided with an outside surface having two parallel ridges defining a channel into which is inserted a tie band that wraps around the seed tube.

* * * * *